US012744634B2

(12) United States Patent
Wakudkar et al.

(10) Patent No.: US 12,744,634 B2
(45) Date of Patent: Sep. 22, 2026

(54) DYNAMIC SP/LPI MULTI-BAND

(71) Applicant: Cisco Technology, Inc., San Jose, CA (US)

(72) Inventors: Sachin D. Wakudkar, St-Sulpice (CH); Domenico Ficara, Essertines-sur-Yverdon (CH); Roberto Muccifora, Ropraz (CH); Amine Choukir, Ecublens (CH); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 290 days.

(21) Appl. No.: 18/429,246

(22) Filed: Jan. 31, 2024

(65) Prior Publication Data

US 2025/0247182 A1 Jul. 31, 2025

(51) Int. Cl.
*H04L 5/00* (2006.01)
*H04L 1/00* (2006.01)
*H04W 72/044* (2023.01)

(52) U.S. Cl.
CPC .......... *H04L 5/0048* (2013.01); *H04L 1/0013* (2013.01); *H04L 5/0078* (2013.01); *H04W 72/0473* (2013.01); *H04L 5/0041* (2013.01)

(58) Field of Classification Search
None
See application file for complete search history.

(56) References Cited

U.S. PATENT DOCUMENTS

2016/0050634 A1* 2/2016 Seok .................. H04W 52/146 370/338
2020/0281027 A1* 9/2020 Damnjanovic ... H04W 74/0891
2021/0058856 A1* 2/2021 Qi ......................... H04W 76/14
2021/0153273 A1* 5/2021 Qi ......................... H04W 8/005
2021/0360633 A1* 11/2021 Chu .................... H04W 52/365

(Continued)

OTHER PUBLICATIONS

Cambium Networks: "Wi-Fi 6E: Extend High Efficiency Into a New Frequency", Solution Paper, 01062022, Jan. 1, 2021, Retrieved from https://www.cambiumnetworks.com/wp-content/uploads/Wi-Fi-6E-Extends-High-Efficiency-Wi-Fi-Into-a-New-Frequency-011622.pdf, pp. 1-11.

(Continued)

*Primary Examiner* — Faiyazkhan Ghafoerkhan
(74) *Attorney, Agent, or Firm* — Rutan & Tucker, LLP; Ravi Mohan; Marc A. McClain

(57) ABSTRACT

Described herein are devices, systems, methods, and processes for optimizing the utilization of large bandwidth channels in wireless communication networks. This is achieved by an access point (AP) identifying parts of the channel available for standard power (SP) transmissions and using novel puncturing messages to allow simultaneous low-power indoor (LPi) transmissions on the "punctured" parts of the channel. The AP can implement different modes to allow concurrent transmissions at SP level on the SP-allowed parts of the channels and at LPi level on part of the channel that do not allow SP transmissions. The AP can also switch unicast communication with a client device to LPi but with a larger channel width as the device nears the AP. The techniques allow for fuller utilization of large bandwidth channels where only a part of the channel is available for SP transmissions, thereby improving network efficiency.

18 Claims, 10 Drawing Sheets

(56) References Cited

U.S. PATENT DOCUMENTS

2021/0409976 A1* 12/2021 Ergen .................. H04W 72/541
2022/0255690 A1* 8/2022 Hu ........................ H04L 1/0008
2022/0272544 A1* 8/2022 Chitrakar .............. H04W 48/12
2022/0312513 A1* 9/2022 Chitrakar .............. H04W 76/30
2022/0400392 A1* 12/2022 Ergen .................... H04W 24/08
2022/0408237 A1* 12/2022 Kneckt ................. H04W 76/28
2022/0408349 A1* 12/2022 Kneckt ................. H04W 76/15
2023/0043655 A1* 2/2023 Hedayat ................ H04W 52/34
2023/0082337 A1* 3/2023 Desai .................... H04W 16/20
370/254
2023/0117111 A1* 4/2023 Chang .................. H04B 7/0837
370/329
2023/0171709 A1* 6/2023 Xu ...................... H04W 52/367
455/522
2023/0179332 A1* 6/2023 Hu ........................ H04L 1/0084
370/329
2023/0232329 A1* 7/2023 Chen ................. H04W 52/0209
455/572
2023/0239083 A1* 7/2023 Yang ................. H04W 72/0453
370/329
2023/0269671 A1* 8/2023 Jones .................. H04W 52/283
455/522
2023/0319736 A1* 10/2023 Sayenko ............. H04W 52/146
455/522
2023/0354168 A1* 11/2023 Yaghoobi .............. H04W 48/16
2024/0031770 A1* 1/2024 Amini ................... H04W 4/023
2024/0107432 A1* 3/2024 Qi ......................... H04W 48/16
2024/0137999 A1* 4/2024 Yaghoobi .............. H04W 76/14
2024/0188158 A1* 6/2024 Flesch ................... H04W 76/15
2024/0224194 A1* 7/2024 Grant .................... H04W 52/32
2024/0259958 A1* 8/2024 Hedayat ................ H04W 52/34
2024/0291616 A1* 8/2024 Desai .................... H04L 5/0053
2024/0414539 A1* 12/2024 Aguirre ............... H04W 12/086
2025/0142591 A1* 5/2025 Yang ..................... H04W 72/25
2025/0247182 A1* 7/2025 Wakudkar ......... H04W 72/0473
2025/0294628 A1* 9/2025 Chitrakar .............. H04W 76/14

OTHER PUBLICATIONS

International Search Report and Written Opinion for International Application No. PCT/US2025/011272, mailed Apr. 1, 2025, 14 Pages.

* cited by examiner 500
5925
5945
6425
6525
6875
7125
U-NII-5
U-NII-6
U-NII-7
U-NII-8
60 x 20MHz
29 x 40MHz
14 x 80MHz
7 x 160MHz
(3 or 6) x 320MHz*
502
504

600

IDENTIFY A CHANNEL
610
IDENTIFY FIRST CHANNEL SEGMENTS
620
IDENTIFY SECOND CHANNEL SEGMENTS
630
ANNOUNCE THE CHANNEL SEGMENTS
640

700

RECEIVE AN AUTOMATED FREQUENCY COORDINATION (AFC) RESPONSE
710
IDENTIFY A CHANNEL
720
IDENTIFY FIRST CHANNEL SEGMENTS
730
IDENTIFY SECOND CHANNEL SEGMENTS
740
ANNOUNCE THE CHANNEL SEGMENTS
750
ESTABLISH AN ASSOCIATION WITH A CLIENT DEVICE
760
TRANSMIT A TRIGGER FRAME
770
RECEIVE COMMUNICATIONS FROM CLIENT DEVICES
780
ADJUST A TRANSMIT POWER MODE
790

800

RECEIVE AN INDICATION OF FIRST CHANNEL SEGMENTS
810
RECEIVE AN INDICATION OF SECOND CHANNEL SEGMENTS
820
ESTABLISH AN ASSOCIATION WITH A NETWORK DEVICE
830
TRANSMIT A COMMUNICATION
840

900

RECEIVE AN INDICATION OF FIRST CHANNEL SEGMENTS
910
RECEIVE AN INDICATION OF SECOND CHANNEL SEGMENTS
920
ESTABLISH AN ASSOCIATION WITH A NETWORK DEVICE
930
RECEIVE A TRIGGER FRAME
940
TRANSMIT A COMMUNICATION
950
ADJUST A TRANSMIT POWER MODE
960

DYNAMIC SP/LPI MULTI-BAND

The present disclosure relates to wireless communication. More particularly, the present disclosure relates to more fully utilizing bandwidth channels where only a part of the channel is available for standard power (SP) transmissions.

BACKGROUND

Wireless communication systems, such as Wi-Fi networks, utilize various frequency bands to transmit and receive data. The frequency bands can be divided into channels, each with a specific bandwidth. The bandwidth of a channel determines the data rate that can be achieved on that channel. Larger bandwidth channels, such as 80, 160, or 320 MHz channels, can support higher data rates, making them desirable for applications that require high-speed data transmission.

However, in many cases, the entire bandwidth of a channel may not be available for use. This can occur due to, by way of non-limiting examples, the presence of radar signals in the 5 GHz band or fixed service (FS) frequencies partially overlapping in the 6 GHz band. The overlapping signals can interfere with Wi-Fi transmissions, reducing the available bandwidth and negatively impacting the performance of the network.

Existing techniques for dealing with this issue may involve puncturing the channel, or not using the portion of the channel where the interfering signal is present. While this approach can help to avoid interference, it may also reduce the effective bandwidth of the channel, limiting the data rate that can be achieved. Furthermore, since these existing approaches do not allow for the efficient use of the punctured bandwidth, spectrum resources may be wasted.

In addition, the channel availability for client devices can be impacted by the limitations of the automated frequency coordination (AFC) system that is specified for the 6 GHz band. In particular, only one full 320 Mhz channel may be available for AFC purposes in the unlicensed national information infrastructure (U-NII) 5 (U-NII-5) band and none may be available in the U-NII-7 band. These limitations can reduce the availability of large bandwidth channels, further complicating the task of managing network resources in a Wi-Fi network.

SUMMARY OF THE DISCLOSURE

Systems and methods for more fully utilizing bandwidth channels where only a part of the channel is available for standard power (SP) transmissions in accordance with embodiments of the disclosure are described herein. In some embodiments, a management logic is configured to select a channel, identify one or more first channel segments of the channel, the one or more first channel segments being usable with a first transmit power mode and a second transmit power mode, identify one or more second channel segments of the channel, the one or more second channel segments being usable with the second transmit power mode, and announce the identified one or more first channel segments or the identified one or more second channel segments.

In some embodiments, one or more first channel segments or the one or more second channel segments are identified based on an automated frequency coordination (AFC) response.

In some embodiments, the channel is selected based on an automated frequency coordination (AFC) response.

In some embodiments, the channel includes a plurality of sub-channels.

In some embodiments, at least one channel segment of the identified one or more first channel segments or the identified one or more second channel segments corresponds to one of the plurality of sub-channels.

In some embodiments, the selected channel spans a boundary between a first unlicensed national information infrastructure (U-NII) band a second U-NII band, the identified one or more first channel segments are included in the first U-NII band, and the identified one or more second channel segments are included in the second U-NII band.

In some embodiments, to announce the identified one or more first channel segments and the identified one or more second channel segments, the management logic is further configured to announce a first indication associated with the first transmit power mode, and announce a second indication associated with the second transmit power mode.

In some embodiments, the first indication is associated with the identified one or more first channel segments and the identified one or more second channel segments, and the second indication is associated with the identified one or more second channel segments.

In some embodiments, the first indication or the second indication is associated with a beacon or a probe response.

In some embodiments, the first indication is associated with a first basic service set identifier (BSSID), and the second indication is associated with a second BSSID.

In some embodiments, the management logic is further configured to establish an association with a client device based on the first BSSID or the second BSSID.

In some embodiments, the management logic is further configured to detect that a client device in association with the second BSSID is nearing an edge of a cell associated with the second BSSID, and transmit an indication of the first BSSID to the client device in response to the detecting that the client device is nearing the edge of the cell.

In some embodiments, the indication of the first BSSID is transmitted via an unsolicited probe response or a basic service set (BSS) transition management (BTM) request.

In some embodiments, the management logic is further configured to transmit an indication of an allocation of a resource unit (RU) to a client device, wherein the indication of the allocation of the RU includes an indication of the first transmit power mode or the second transmit power mode based on whether the RU is located in the identified one or more first channel segments or the identified one or more second channel segments.

In some embodiments, the indication of the first transmit power mode or the second transmit power mode is based further on a capability of the client device.

In some embodiments, the management logic is further configured to transmit a communication to a client device based on at least one of the identified one or more second channel segments and the second transmit power mode in response to detecting that a distance between the client device and the network device is less than a threshold.

In some embodiments, the first transmit power mode corresponds to a standard power mode, and the second transmit power mode corresponds to a low-power indoor mode.

In some embodiments, a management logic is configured to receive an indication of one or more first channel segments of a channel or one or more second channel segments of the channel, the one or more first channel segments being usable with a first transmit power mode and a second transmit power mode, the one or more second channel segments being usable with the second transmit power mode, and transmit a communication based on the indication.

In some embodiments, the management logic is further configured to simultaneously transmit, via a first link, a first communication based on at least one of the one or more first channel segments and the first transmit power mode and, via a second link, a second communication based on at least one of the one or more second channel segments and the second transmit power mode, and the first link and the second link are associated with a multi-link operation.

In some embodiments, wireless communication includes selecting a channel, identifying one or more first channel segments of the channel, the one or more first channel segments being usable with a first transmit power mode and a second transmit power mode, identifying one or more second channel segments of the channel, the one or more second channel segments being usable with the second transmit power mode, and announcing an indication of the identified one or more first channel segments or the identified one or more second channel segments.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
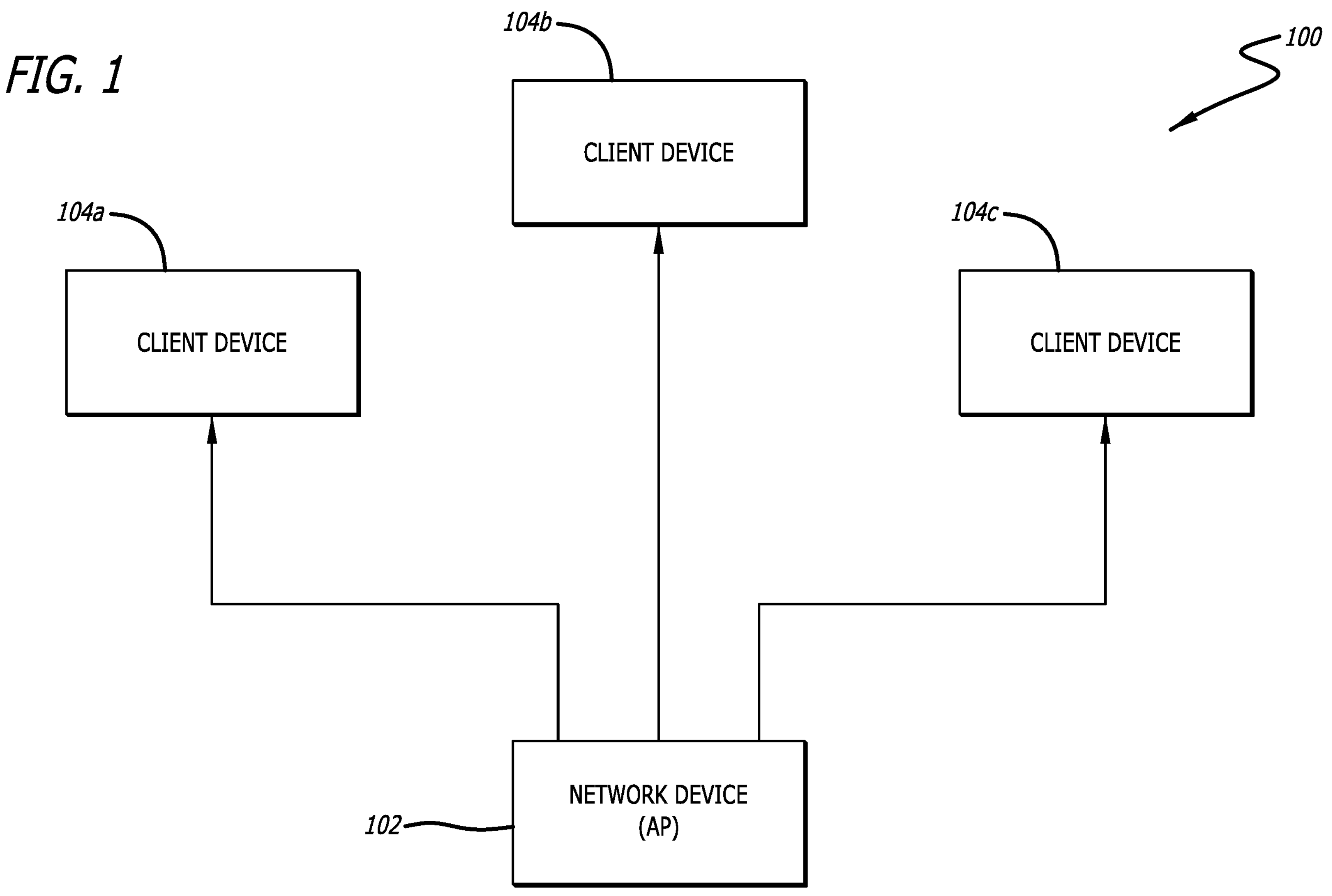
FIG. 1 is a diagram illustrating a network device implementing an optimized utilization of large bandwidth channels in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that optimize the utilization of large bandwidth channels in wireless communication networks. This may be achieved by an access point (AP) identifying parts of the channel available for standard power (SP) transmissions and using novel puncturing messages to allow simultaneous low-power indoor (LPi) transmissions on the LPi "punctured" parts of the channel. Hereinafter the parts of the channel available for SP transmissions can be referred to as first channel segments, and the parts of the channel where SP transmissions are not allowed (i.e., the LPi "punctured" parts) may be referred to as second channel segments.

In many embodiments, the AP may request the frequency-based response from an automated frequency coordination (AFC) system. The response from the AFC system can indicate the channels or parts of the channels where SP transmissions are not allowed due to, by way of a non-limiting example, the presence of incumbents (e.g., a fixed service (FS)). In a number of embodiments, to select a channel, the AP may examine the power spectral density (PSD) distribution across the allowed frequency spectrum. The AP can then select the channel that offers the highest constant PSD (e.g., the channel with the highest quality) over the largest bandwidth, even though the entire channel may not be available (for SP transmissions) and only parts of the channel may be available (e.g., as indicated by the response from the AFC system). By way of a non-limiting example, the AP may find a suitable channel, but may also find that LPi PSD is overlapping in a small section of the frequency spectrum; in other words, most but not the entire channel can be available for SP transmissions. In a variety of embodiments, the AP may decide to use the channel, even though the entire channel may not be available for SP transmissions, and can apply LPi puncturing to parts of the channel where SP transmissions are not allowed. Hereinafter an LPi puncture (in contrast to a conventional puncture) may refer to a segment of the channel where SP transmissions cannot be utilized, but LPi transmissions can still be utilized by transmitters. This is in contrast to a conventional puncture, where the punctured segment of the channel cannot be utilized for any transmissions.

In some embodiments, a channel may be conceived as including multiple sub-channels. By way of a non-limiting example, an 80 MHz channel can be conceived as including 4 20 MHz sub-channels. In more embodiments, the AP may announce all sub-channels of the channel in the SP mode, but can also indicate that one or more of the announced sub-channels should be punctured (conventional puncturing or LPi puncturing). By way of a non-limiting example, an 80 MHz channel can be conceived as including 4 20 MHz sub-channels at channels 1, 5, 9, and 13, where the sub-channels at channels 1, 5, and 13 may be available for SP transmissions and the sub-channel at channel 9 may not be available for SP transmissions. Accordingly, the AP can announce (e.g., on the primary 20 MHz channel at channel 1) 20 MHz channels 1, 5, 9, and 13 in the SP mode, and may also indicate (e.g., utilizing an augmented mode of 802.11ax puncturing) that channel 9 should be punctured. In additional embodiments, a client device may associate with the wide channel including all the sub-channels. Therefore, in the present example, a client device can associate with the AP in the 80 MHz channel. In further embodiments, the client device may transmit just over the non-punctured sub-channels (i.e., the first channel segments) (e.g., channels 1, 5, and 13) in SP. In still more embodiments, the client device can transmit over the entire channel (e.g., channels 1, 5, 9, and 13) in LPi. In still further embodiments, the client device can transmit over the non-punctured sub-channels (e.g., channels 1, 5, and 13) in SP and over the punctured sub-channels (i.e., the second channel segments) (e.g., channel 9) in LPi.

In still additional embodiments, the AP may indicate that the client device may transmit just over the non-punctured sub-channels (i.e., the first channel segments) in SP. In some more embodiments, the AP can indicate that the client device may transmit over the entire channel in LPi. In certain embodiments, the AP may indicate that the client device may choose between transmitting just over the non-punctured sub-channels in SP and transmitting over the entire channel in LPi. In yet more embodiments, the AP can indicate that the client device may transmit over the non-punctured sub-channels in SP and over the punctured sub-channels (i.e., the second channel segments) in LPi. In still yet more embodiments, the AP may indicate that the client device may choose any of the three above-described schemes.

In many further embodiments, to maximize the capacity of a 320 MHz channel that is partially located within the unlicensed national information infrastructure (U-NII) 7 (U-NII-7) band (i.e., the 320 MHz channel may span the boundary between the U-NII-7 band and the U-NII-6 band, or the boundary between the U-NII-7 band and the U-NII-8 band), the AP may LPi puncture the channel in the U-NII-6 band or the UNII-8 band. Accordingly, the part of the 320 MHz channel in the U-NII-7 band can be utilized in SP (if the part in the U-NII-7 band is not unavailable for SP transmissions for other reasons), while the part of the channel in the U-NII-6 band or the U-NII-8 band may be utilized in LPi. In many additional embodiments, the AP may transmit separate beacons and/or probe responses for the LPi and SP modes. In still yet further embodiments, the AP can associate the LPi and SP modes with two different basic service set identifiers (BSSIDs) (i.e., an SP BSSID and an LPi BSSID). Accordingly, in still yet additional embodiments, as a client device associates with the AP, the AP may observe the BSSID to which the client has established the connection. LPi client devices may be expected to connect to just the LPi BSSID, while SP client devices can connect to either the SP BSSID or the LPi BSSID.

In several embodiments, a client device may utilize the multi-link operation (MLO) to implement dual connectivity on the same band in order to simultaneously transmit in SP and LPi. Accordingly, the client device can implement the SP and LPi connectivity via two different MLO links. In this mode, a client device that can transmit simultaneously on both MLO links (e.g., a simultaneous transmit and receive (STR) client device) may transmit, on a first link, a punctured signal (i.e., the signal has no energy over the LPi punctured parts of the channel) in SP over the non-punctured parts of the channel (i.e., the first channel segments) and can, simultaneously transmit, on a second link, a signal in LPi over the LPi punctured parts of the channel (i.e., the second channel segments).

For orthogonal frequency division multiple access (OFDMA) or uplink multi-user multiple input multiple output (UL-MU-MIMO) operation, the AP may transmit a trigger frame to schedule client devices for uplink transmissions to the AP over different resource units (RUs). In several more embodiments, based on whether an RU is located in the non-punctured parts of the channel (i.e., the first channel segments) or the LPi punctured parts of the channel (i.e., the second channel segments), the AP can indicate the SP mode or the LPi mode for the RU in the trigger frame. In particular, if the RU is located in the non-puncture parts of the channel, the AP may indicate the SP mode for the RU; on the other hand, if the RU is located in the LPi punctured parts of the channel, the AP can indicate the LPi mode for the RU. In numerous embodiments, the AP may consider the capability of the client device (e.g., an SP client device or an LPi client device) when allocating the RUs to the client devices. By way of non-limiting examples, the AP can allocate an RU that is available for SP transmissions (i.e., the RU is located in the non-punctured parts of the channel) to an SP client device, and may allocate an RU that is available just for LPi transmissions (i.e., the RU is located in the LPi punctured parts of the channel) to an LPi client device.

In numerous additional embodiments, the AP may transmit an indication of the presence of the SP BSSID to a client device in association in LPi via an LPi BSSID in response to detecting that the client device is nearing the edge of the LPi cell. In further additional embodiments, the AP can detect that the client device is nearing the LPi cell edge based on received signal strength indicator (RSSI) measurements and/or the modulation and coding scheme (MCS) being utilized. A lower RSSI measurement and/or a lower MCS can indicate that the client device is farther away from the AP and closer to the cell edge. In some embodiments, the indication of the presence of the SP BSSID may include an unsolicited probe response including the SP BSSID. In more embodiments, the AP can send a basic service set (BSS) transition management (BTM) request (e.g., an 802.11v BTM request) in response to detecting that the client device is nearing the edge of the LPi cell to suggest that the client device roam to the SP BSSID. In additional embodiments, the AP may generally announce both the SP BSSID and the LPi BSSID. In further embodiments, the AP may initially announce just the LPi BSSID, and can notify a client device in association with the LPi BSSID of the availability of the SP BSSID as appropriate (e.g., when the client device nears the LPi cell edge). Switching from LPi to SP (i.e., increasing the transmit power) may enable the client device to continue to communicate with the AP even as the client device moves outside the range of the LPi cell.

In still more embodiments, the AP may generally announce just the non-punctured parts of the channel (i.e., first channel segments) at SP, and can switch to LPi communication with a client device as appropriate (e.g., as the client device nears the AP). In still further embodiments, as the unicast communication is switched to LPi, the AP can also announce the LPi punctured parts of the channel (i.e., the second channel segments), so that entire channel may be utilized for communication in LPi. By way of a non-limiting example, for an 80 MHz channel that includes 40 MHz non-punctured parts and 40 MHz LPi punctured parts, the AP can advertise just the 40 MHz non-punctured parts (e.g., over a first 20 MHz (sub-) channel) (e.g., as a 40 MHz channel). As a client device moves near the AP (thus requiring less power to communicate), the AP may switch the unicast communication with the client device to LPi. The AP can also increase the bandwidth of the channel to 80 MHZ (encompassing both the non-punctured parts and the punctured parts of the 80 MHz channel). The decrease in transmit power may cause a decrease in the MCS, but the extension of the channel width can result in a same, if not greater throughput.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a diagram 100 illustrating a network device implementing an optimized utilization of large bandwidth channels in accordance with various embodiments of the disclosure is shown. In the embodiments depicted in FIG. 1, the network device 102 may be an AP. Further, the network device 102 can communicates with multiple client devices 104*a*, 104*b*, and 104*c*. It should be appreciated that FIG. 1 is illustrative and non-limiting. For example, there may be more or fewer client devices than the client devices 104*a*, 104*b*, and 104*c* shown in the embodiments depicted in FIG. 1.

In many embodiments, the network device 102 may identify parts of the channel available for SP transmissions, and can use novel puncturing messages to allow simultaneous LPi transmissions on the LPi punctured parts of the channel. In a number of embodiments, to select a channel, the network device 102 can examine the PSD distribution across the allowed frequency spectrum, and may select the channel that offers the highest constant PSD (i.e., the channel with the highest quality) over the largest bandwidth.

In a variety of embodiments, any of the client devices 104*a*, 104*b*, and 104*c* can transmit just over the non-punctured parts of the channel in SP. In some embodiments, any of the client devices 104*a*, 104*b*, and 104*c* can transmit over the entire channel in LPi. In more embodiments, any of the client devices 104*a*, 104*b*, and 104*c* may transmit over the non-punctured parts of the channel in SP and over the LPi punctured parts of the channel in LPi. In additional embodiments, the client device 104*a*, 104*b*, or 104*c* can select the transmit power scheme based on an indication from the network device 102.

In further embodiments, the network device 102 may announce all available sub-channels of the channel in SP mode, but can also indicate that one or more of the announced sub-channels should be punctured. In still more embodiments, the network device 102 may utilize separate beacons and/or probe responses for the LPi and SP modes. In still further embodiments, the network device 102 can announce two different BSSIDs, including an SP BSSID for the SP mode and an LPi BSSID for the LPi mode. In still additional embodiments, as a client device 104*a*, 104*b*, and 104*c* associates with the network device 102, the network device 102 may observe the BSSID to which the client device has established an association. LPi client devices may be expected to connect just to the LPi BSSID, while SP client devices can connect to either the SP BSSID or the LPi BSSID.

Although a specific embodiment for a network device implementing optimized utilization of large bandwidth channels suitable for carrying out the various steps, processes, methods, and operations described herein is discussed with respect to FIG. 1, any of a variety of systems and/or processes may be utilized in accordance with embodiments of the disclosure. For example, the network device may implement different modes to allow concurrent transmissions at SP level on the SP-allowed parts of the channels. The elements depicted in FIG. 1 may also be interchangeable with other elements of FIGS. 2-10 as required to realize a particularly desired embodiment.

Figure 2:
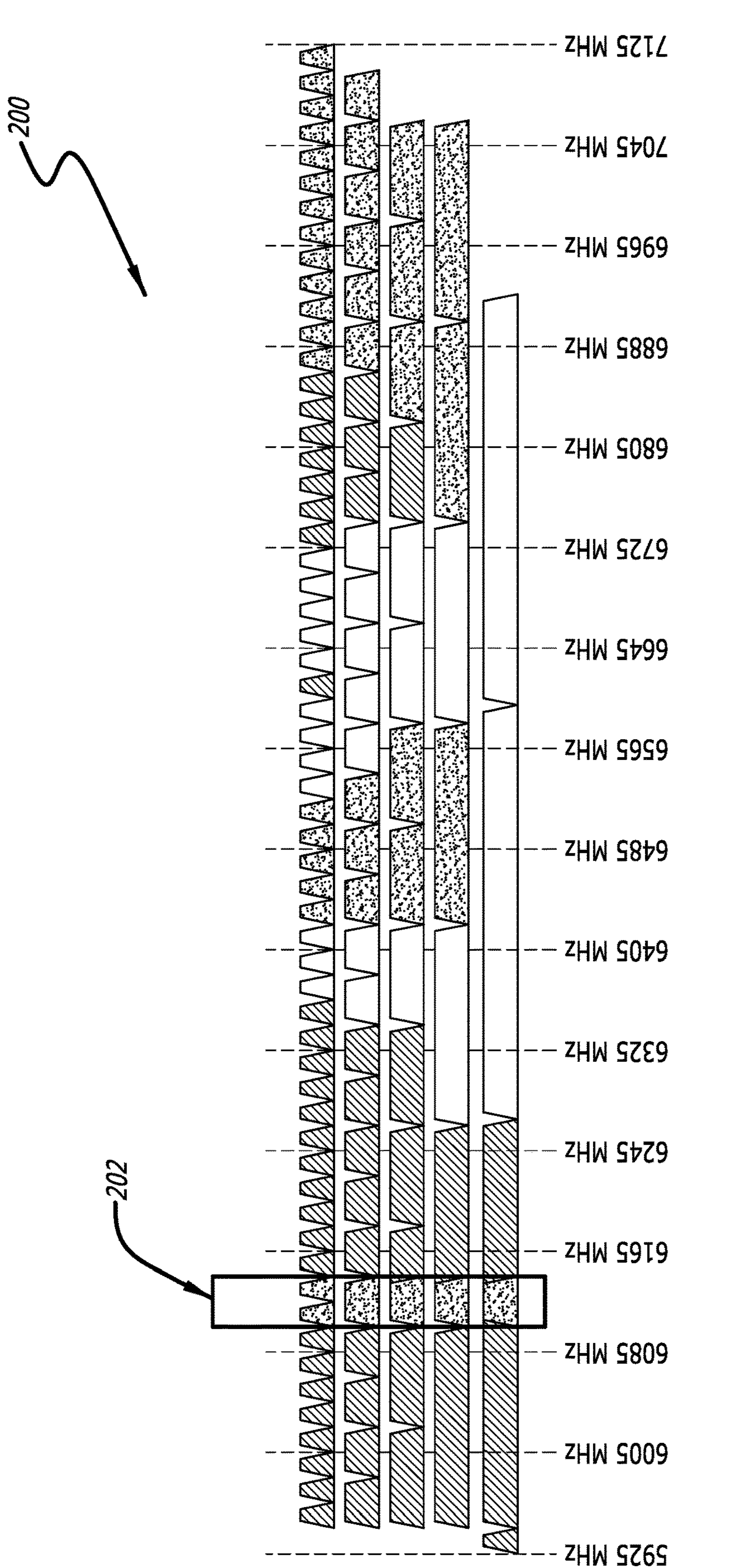
FIG. 2 is a diagram illustrating conventional frequency puncturing in a wireless communication network in accordance with various embodiments of the disclosure.

Referring to FIG. 2, a diagram 200 illustrating conventional frequency puncturing in a wireless communication network in accordance with various embodiments of the disclosure is shown. The embodiments depicted in FIG. 2 shows a 40 MHz frequency band 202 that is not available for SP transmissions. Accordingly, the band 202 may be punctured, and no transmissions can be allowed over this band.

The unavailability of the 40 MHz band 202 for SP transmissions may be due to various reasons. By way of non-limiting examples, it can be due to regulatory restrictions in certain frequency bands to protect incumbent services, such as satellite communication or radar systems. It may also be due to interference considerations, where using the band for SP transmissions can cause unacceptable interference to other users or services.

As shown, the punctured band 202 may correspond to two 20 MHz channels, one 40 MHz channel, a part of an 80 MHz channel, a part of a 160 MHz channel, or a part of a 320 MHz channel. The punctured band 202 can be completely unavailable for any transmissions, whether in SP or LPi. This approach, while effective in avoiding interference, may have a significant drawback. It can lead to underutilization of the available spectrum, as the punctured band may remain unused even when it could potentially be used for LPi transmissions without causing harmful interference. This is in contrast to LPi puncturing as described herein with respect to various embodiments of the disclosure.

Although a specific embodiment for conventional frequency puncturing in a wireless communication network suitable for carrying out the various steps, processes, methods, and operations described herein is discussed with respect to FIG. 2, any of a variety of systems and/or processes may be utilized in accordance with embodiments of the disclosure. For example, the network device can implement a dynamic channel selection process that avoids the punctured band when selecting channels for SP transmissions. The elements depicted in FIG. 2 may also be interchangeable with other elements of FIGS. 1 and 3-10 as required to realize a particularly desired embodiment.

Figure 3:
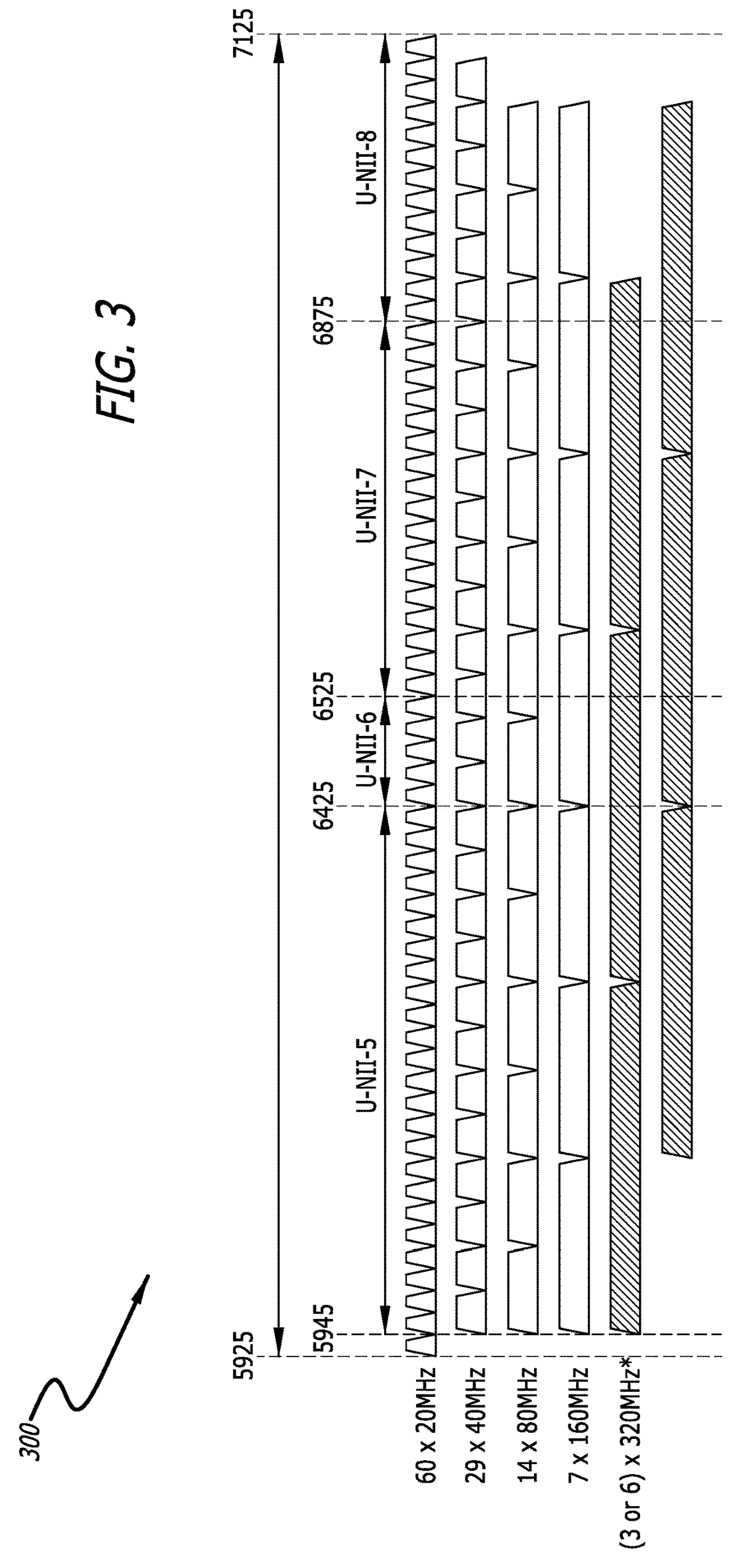
FIG. 3 is a diagram illustrating channelization for 320 MHz channels in the 6 GHz band in accordance with various embodiments of the disclosure.

Referring to FIG. 3, a diagram 300 illustrating channelization for 320 MHz channels in the 6 GHz band in accordance with various embodiments of the disclosure is shown. As shown, a 320 MHz channel may consist of two adjacent 160 MHz channels. Two types of channelizations for the 320 MHz channel are defined: 320 MHZ-1 and 320 MHz-2. 320 MHz-1 may be defined as a 320 MHz channel with channel center frequency numbers 31, 95, and 159. 320 MHz-2 can be defined as a 320 MHz channel with channel center frequency numbers 63, 127, and 191. 320 MHz channelization may allow for a wide bandwidth, which can support high data rate transmissions or multiple concurrent transmissions.

However, just one full 320 MHz channel may be available for the AFC system in the U-NII-5 band. No 320 MHz channel can be available for the AFC system in the U-NII-7 band. This is because, as shown, a 320 MHz channel can only be partially inside the U-NII-7 band, as it overlaps either the U-NII-6 band or U-NII-8 band. When a channel is not available for the AFC system, it cannot be used for SP transmissions that require AFC for interference management. This can limit the available spectrum for such transmissions and potentially impact the capacity and performance of the network. Thus, 320 MHz channels may be impractical without specific provisions.

Although a specific embodiment for channelization of 320 MHz channels in the 6 GHz band suitable for carrying out the various steps, processes, methods, and operations described herein is discussed with respect to FIG. 3, any of a variety of systems and/or processes may be utilized in accordance with embodiments of the disclosure. For example, the network device may implement advanced interference management techniques to mitigate the impact of the overlapping channels. The elements depicted in FIG. 3 may also be interchangeable with other elements of FIGS. 1, 2, and 4-10 as required to realize a particularly desired embodiment.

Figure 4:
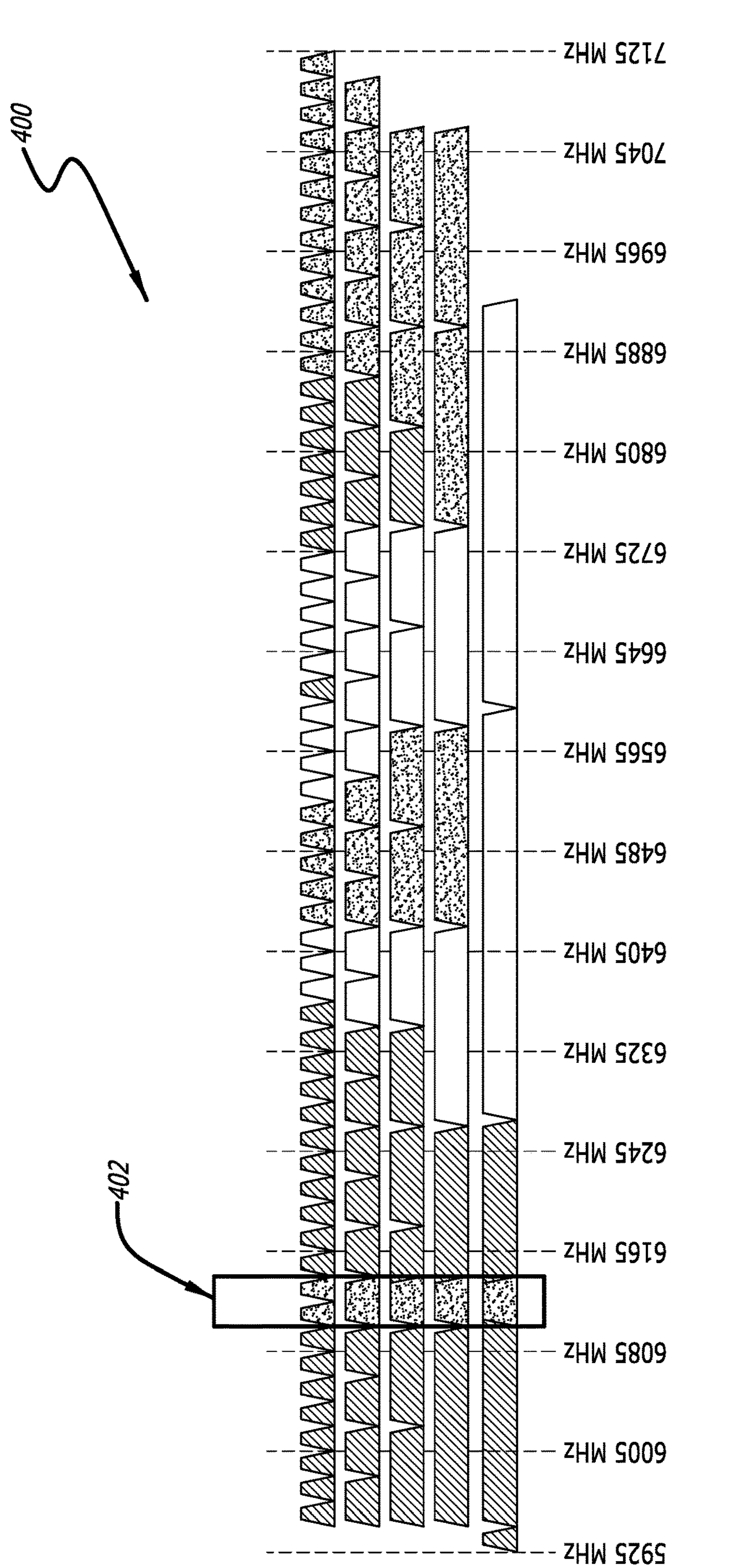
FIG. 4 is a diagram illustrating low-power indoor (LPi) puncturing in a wireless communication network in accordance with various embodiments of the disclosure.

Referring to FIG. 4, a diagram 400 illustrating LPi puncturing in a wireless communication network in accordance with various embodiments of the disclosure is shown. In the embodiments depicted in FIG. 4, a 40 MHz frequency band 402 may not be available for SP transmissions. The unavailability of the 40 MHz band 402 for SP transmissions can be due to various reasons, such as regulatory restrictions or interference considerations. In many embodiments, the band 402 can be LPi punctured. Accordingly, while SP transmissions may not be allowed over the band 402, LPi transmissions can still be utilized over the band 402. By allowing LPi transmissions over the band 402, the spectrum can be utilized more efficiently, potentially improving network capacity and performance.

As shown, the LPi punctured band 402 may correspond to two 20 MHz channels, one 40 MHz channel, a part of an 80 MHz channel, a part of a 160 MHz channel, or a part of a 320 MHz channel. In a number of embodiments, if the network device (AP) selects a channel that overlaps with the band 402, the network device can announce both the LPi punctured parts and non-punctured parts (if any) of the channel. This may allow client devices to understand which parts of the channel they can use for SP transmissions (and LPi transmissions, if desired) and which parts they can use just for LPi transmissions. In a variety of embodiments, based on network device indication and/or client device choice, a client device can then transmit just over the non-punctured parts of the channel in SP, over the entire channel in LPi, or over the non-punctured parts of the channel in SP and over the LPi punctured parts of the channel in LPi.

Although a specific embodiment for LPi puncturing in a wireless communication network suitable for carrying out the various steps, processes, methods, and operations described herein is discussed with respect to FIG. 4, any of a variety of systems and/or processes may be utilized in accordance with embodiments of the disclosure. For example, the network device can implement advanced interference management techniques to ensure that the LPi transmissions over the LPi punctured band do not cause unacceptable interference to other users or services. The elements depicted in FIG. 4 may also be interchangeable with other elements of FIGS. 1-3 and 5-10 as required to realize a particularly desired embodiment.

Figure 5:
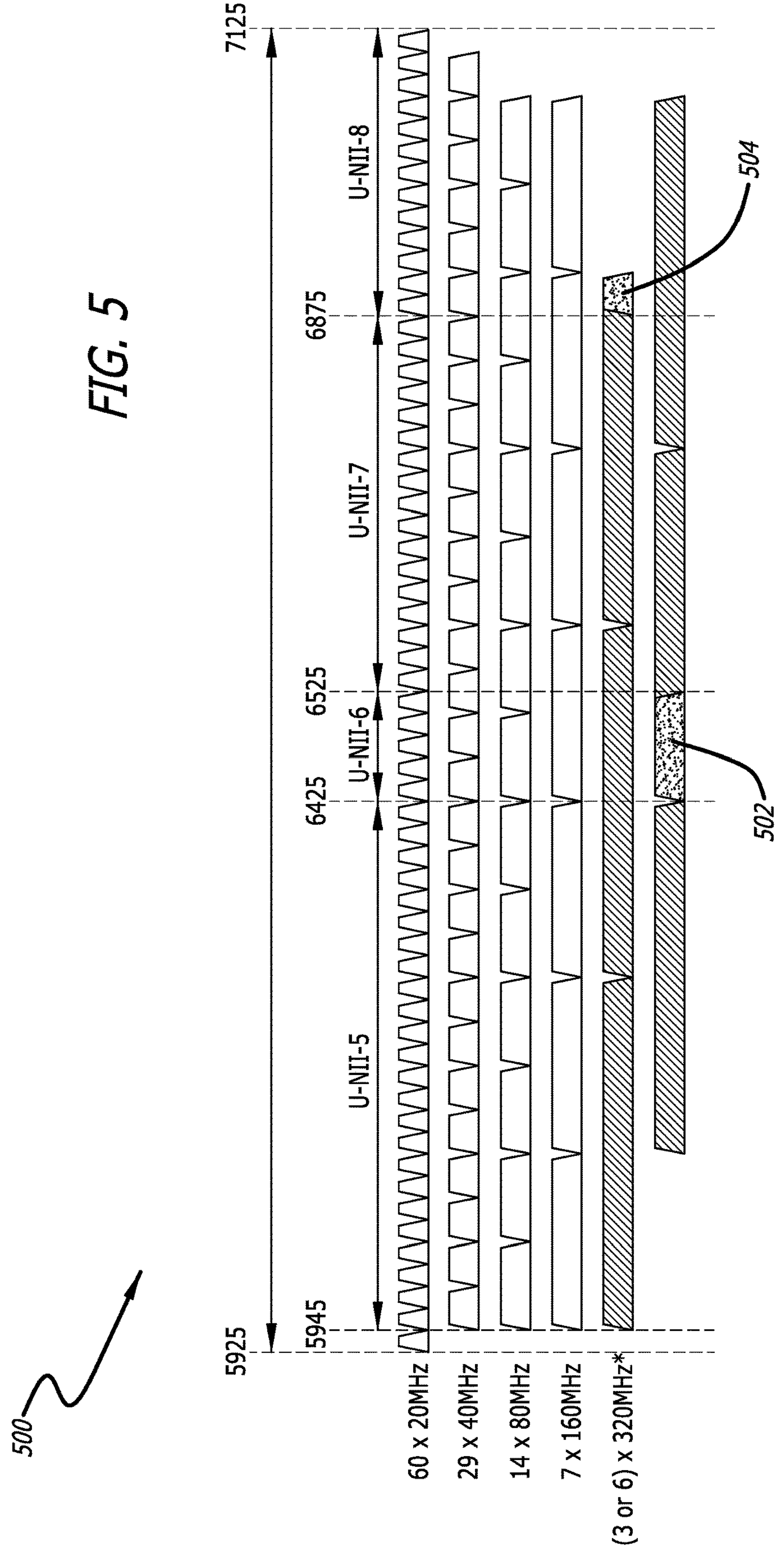
FIG. 5 is a diagram illustrating the maximization of the capacity of a 320 MHz channel that is partially located within the unlicensed national information infrastructure (U-NII) 7 (U-NII-7) band in accordance with various embodiments of the disclosure.

Referring to FIG. 5, a diagram 500 illustrating the maximization of the capacity of a 320 MHz channel that is partially located within the U-NII-7 band in accordance with various embodiments of the disclosure is shown. In many embodiments, a network device (AP) may implement LPi puncturing to optimize the use of a 320 MHz channel that spans the boundary between the U-NII-7 band and either the U-NII-6 band or the U-NII-8 band. In a number of embodiments, the network device can LPi puncture the part 502 of the 320 MHz channel (i.e., the 320 MHz-2 channel with the channel center frequency numbered 127) that is in the U-NII-6 band. By LPi puncturing this part 502 of the channel, the network device can allow LPi transmissions over this band 502, while the rest of the channel in the U-NII-7 band can be utilized for SP transmissions, if it is not unavailable for SP transmissions for other reasons.

In a variety of embodiments, the network device can LPi puncture the part 504 of the 320 MHz channel (i.e., the 320 MHz-1 channel with the channel center frequency numbered 159) that is in the U-NII-8 band. Similar to embodiments described above, by LPi puncturing this part 504 of the channel, the network device can allow LPi transmissions over this band 504, while the rest of the channel in the U-NII-7 band can be utilized for SP transmissions, if it is not unavailable for SP transmissions for other reasons. Accordingly, the LPi puncturing in 320 MHz channels may allow for the efficient use of the available spectrum, even when certain parts of a channel are not available for SP transmissions (e.g., due to limitations of the AFC system). It can also provide flexibility in channel selection and utilization, which can help improve network capacity and performance.

Although a specific embodiment for maximizing the capacity of a 320 MHz channel that is partially located within the U-NII-7 band suitable for carrying out the various steps, processes, methods, and operations described herein is discussed with respect to FIG. 5, any of a variety of systems and/or processes may be utilized in accordance with embodiments of the disclosure. For example, the network device may employ a dynamic channel selection process that takes into account the availability of SP and LPi transmissions over different parts of the channel. The elements depicted in FIG. 5 may also be interchangeable with other elements of FIGS. 1-4 and 6-10 as required to realize a particularly desired embodiment.

Figure 6:
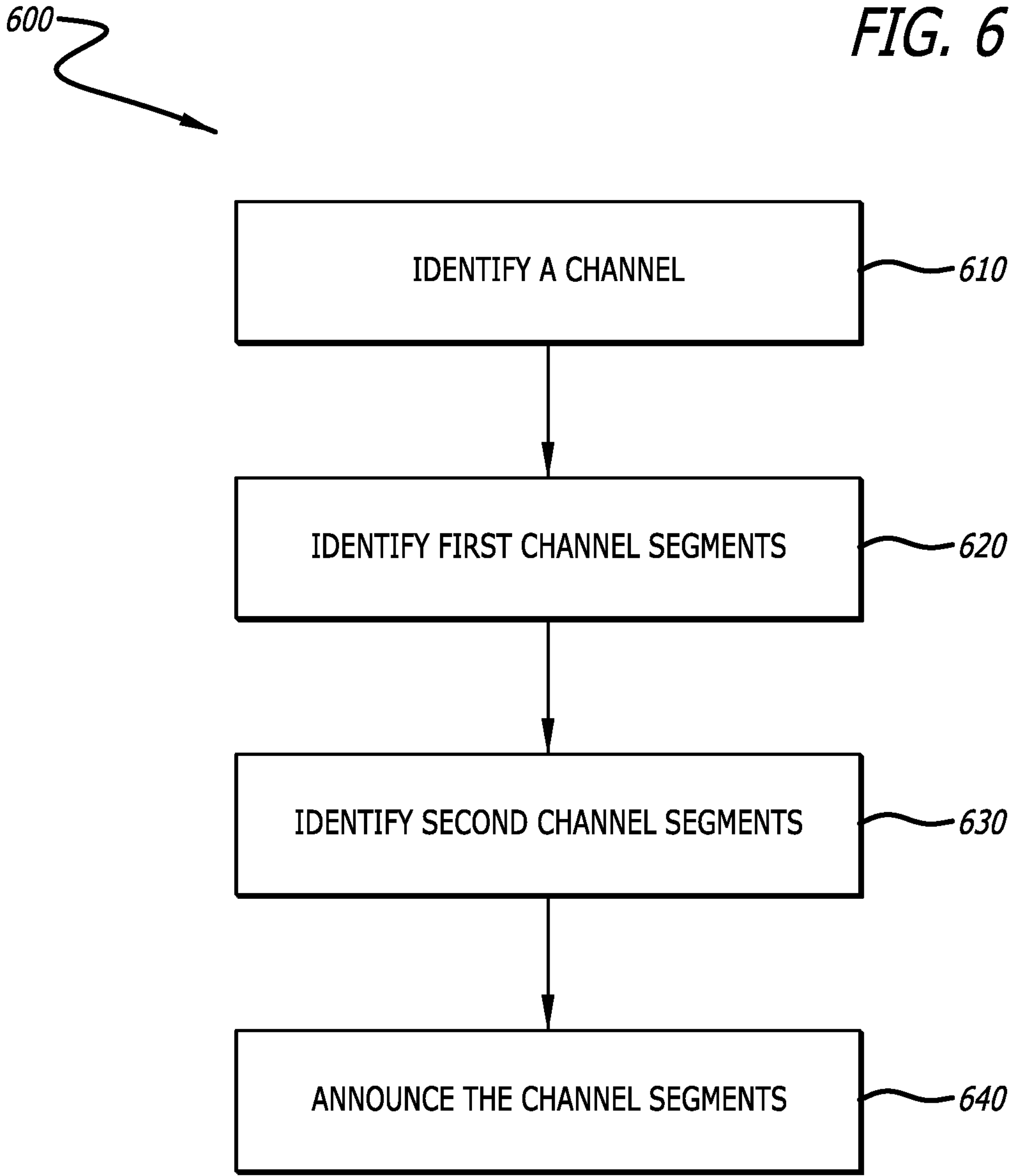
FIG. 6 is a flowchart showing a process for identifying and announcing channel segments in accordance with various embodiments of the disclosure.

Referring to FIG. 6, a flowchart showing a process 600 for identifying and announcing channel segments in accordance with various embodiments of the disclosure is shown. In many embodiments, the process 600 may identify a channel (block 610). This can involve selecting a channel based on various factors such as network specifications, regulatory restrictions, or interference considerations. In a number of embodiments, the channel may be selected based on an AFC response. In a variety of embodiments, the channel with the highest quality over the largest bandwidth can be selected, even though the entire channel may not be available for SP transmissions.

In some embodiments, the process 600 may identify one or more first channel segments of the channel (block 620). The first channel segments can be usable with both the SP transmit power mode and the LPi transmit power mode. In more embodiments, the identification of the first channel segments may be based on the AFC response. In additional embodiments, the first channel segments may correspond to sub-channels of the selected channel.

In further embodiments, the process 600 may identify one or more second channel segments of the channel (block 630). The second channel segments can be usable with just the LPi transmit power mode. In still more embodiments, the identification of the second channel segments may be based on the AFC response. In still further embodiments, the second channel segments may correspond to sub-channels of the selected channel.

In still additional embodiments, the process 600 can announce the identified channel segments (block 640). This can involve announcing the identified first channel segments and/or the identified second channel segments. In some more embodiments, announcing the identified channel segments may include transmitting an SP transmit power mode indication and/or an LPi transmit power mode indication. In certain embodiments, the announcements and/or the indications can be included in a beacon frame, a probe response frame, and/or another type of management frame. In yet more embodiments, different BSSIDs can be utilized for the SP transmit power mode and the LPi transmit power mode. In particular, a first BSSID may be associated with the SP transmit power mode (i.e., an SP BSSID), and a second BSSID can be associated with the LPi transmit power mode (i.e., an LPi BSSID).

Although a specific embodiment for identifying and announcing channel segments suitable for carrying out the various steps, processes, methods, and operations described herein is discussed with respect to FIG. 6, any of a variety of systems and/or processes may be utilized in accordance with embodiments of the disclosure. For example, the process can include additional operations such as, but not limited to, establishing an association with a client device based on the announced BSSIDs. The elements depicted in FIG. 6 may also be interchangeable with other elements of FIGS. 1-5 and 7-10 as required to realize a particularly desired embodiment.

Figure 7:
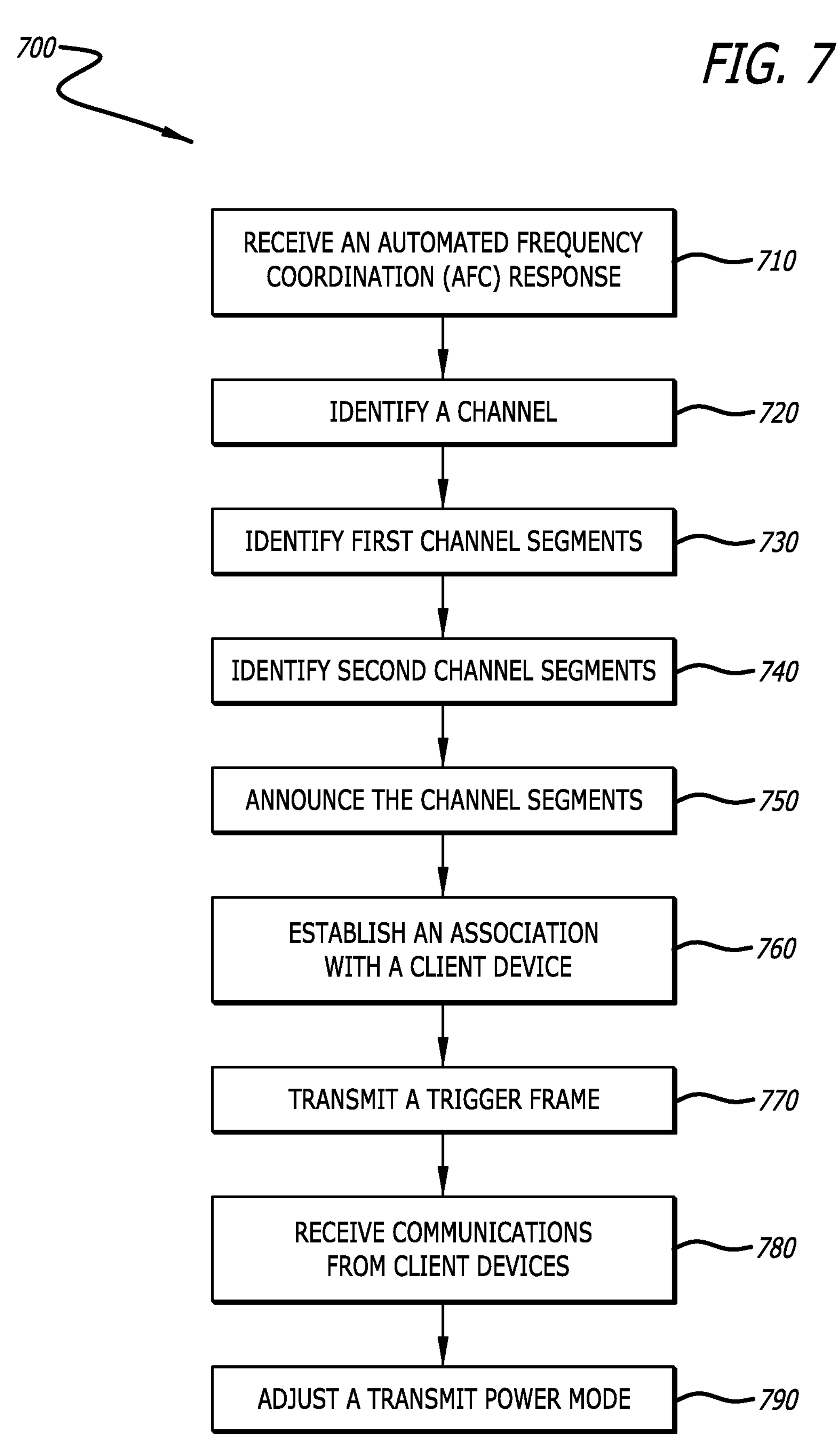
FIG. 7 is a flowchart showing a process for managing channel segments and client device communications in accordance with various embodiments of the disclosure.

Referring to FIG. 7, a flowchart showing a process 700 for managing channel segments and client device communications in accordance with various embodiments of the disclosure is shown. In many embodiments, the process 700 may receive an AFC response (block 710). The AFC response can provide data about available frequencies, power restrictions, or other regulatory requirements that can guide the subsequent steps of the process. In a number of embodiments, the AFC response can be received from a regulatory database or another authoritative source.

In a variety of embodiments, the process 700 may identify a channel (block 720). This can involve selecting a channel based on various factors such as network specifications, regulatory restrictions, or interference considerations. In some embodiments, the channel may be selected based on an AFC response. In particular, the channel can be selected from a set of available channels indicated in the AFC response. In more embodiments, the channel with the highest quality over the largest bandwidth can be selected, even though the entire channel may not be available for SP transmissions.

In additional embodiments, the process 700 may identify one or more first channel segments of the channel (block 730). The first channel segments can be usable with both the SP transmit power mode and the LPi transmit power mode. In further embodiments, the identification of the first channel segments may be based on the AFC response. In still more embodiments, the first channel segments may correspond to sub-channels of the selected channel.

In still further embodiments, the process 700 may identify one or more second channel segments of the channel (block 740). The second channel segments can be usable with just the LPi transmit power mode. In still additional embodiments, the identification of the second channel segments may be based on the AFC response. In some more embodiments, the second channel segments may correspond to sub-channels of the selected channel.

In certain embodiments, the process 700 can announce the identified channel segments (block 750). This can involve announcing the identified first channel segments and/or the identified second channel segments. In yet more embodiments, announcing the identified channel segments may include transmitting an SP transmit power mode indication and/or an LPi transmit power mode indication. In still yet more embodiments, the announcements and/or the indications can be included in a beacon frame, a probe response frame, and/or another type of management frame. In many further embodiments, different BSSIDs can be utilized for the SP transmit power mode and the LPi transmit power mode. In particular, a first BSSID may be associated with the SP transmit power mode (i.e., an SP BSSID), and a second BSSID can be associated with the LPi transmit power mode (i.e., an LPi BSSID).

In many additional embodiments, the process 700 can establish an association with a client device (block 760). This may involve exchanging association request and response frames with the client device. In still yet further embodiments, the association can be established based on one of the announced BSSIDs (e.g., the SP BSSID or the LPi BSSID). In still yet additional embodiments, the network device may confirm the transmit power mode that will be utilized by a client device based on the BSSID to which the client device has established the connection.

In several embodiments, the process 700 can transmit a trigger frame (block 770). In several more embodiments, this may initiate a multi-user communication session, where multiple client devices can transmit in response to the trigger frame. The trigger frame can include scheduling data for the client devices. In numerous embodiments, the network device can include an indication of the transmit power mode (e.g., the SP mode or the LPi mode) for a respective RU in the trigger frame. In numerous additional embodiments, the indication of the transmit power mode may be based on whether the RU is included in the first channel segments or the second channel segments. In further additional embodiments, the scheduling data may be based on capabilities of client devices. For example, an RU located in the first channel segments may be allocated to an SP client device, while another RU located in the second channel segments can be allocated to an LPi client device.

In some embodiments, the process 700 can receive communications from client devices (block 780). In more embodiments, the communications could be received in response to the transmitted trigger frame. In additional embodiments, the communications may be associated with transmit power modes based on the transmit power mode indications in the trigger frame. In further embodiments, the communications can include data packets, acknowledgment frames, or other types of frames.

In still more embodiments, the process 700 can adjust a transmit power mode (block 790). In still further embodiments, the adjustment of the transmit power mode can be performed dynamically to adapt to changes in the network conditions or the capabilities of the devices. In still additional embodiments, the network device may cause a client device to switch from the LPi mode to the SP mode in response to detecting that the client device is nearing an LPi cell edge. In some more embodiments, to cause such a switch, the network device can transmit an unsolicited probe response frame to advertise the presence of an SP BSSID. In certain embodiments, to cause such a switch, the network device may transmit a BTM request to recommend that the client device roam to the SP BSSID. In yet more embodiments, the network device may cause itself and/or a client device to switch from the SP mode to the LPi mode in response to detecting that the client device is close to the network device (e.g., the distance between the client device and the network device may be less than a threshold). In still yet more embodiments, in response to switching to the LPi mode, the network device can also increase the channel width to include both the first channel segments and the second channel segments in response to detecting that the client device is close the network device.

Although a specific embodiment for managing channel segments and client device communications suitable for carrying out the various steps, processes, methods, and operations described herein is discussed with respect to FIG. 7, any of a variety of systems and/or processes may be utilized in accordance with embodiments of the disclosure. For example, the process can include additional operations such as, but not limited to, adjusting the transmit power mode based on a capability of the client device. The elements depicted in FIG. 7 may also be interchangeable with other elements of FIGS. 1-6 and 8-10 as required to realize a particularly desired embodiment.

Figure 8:
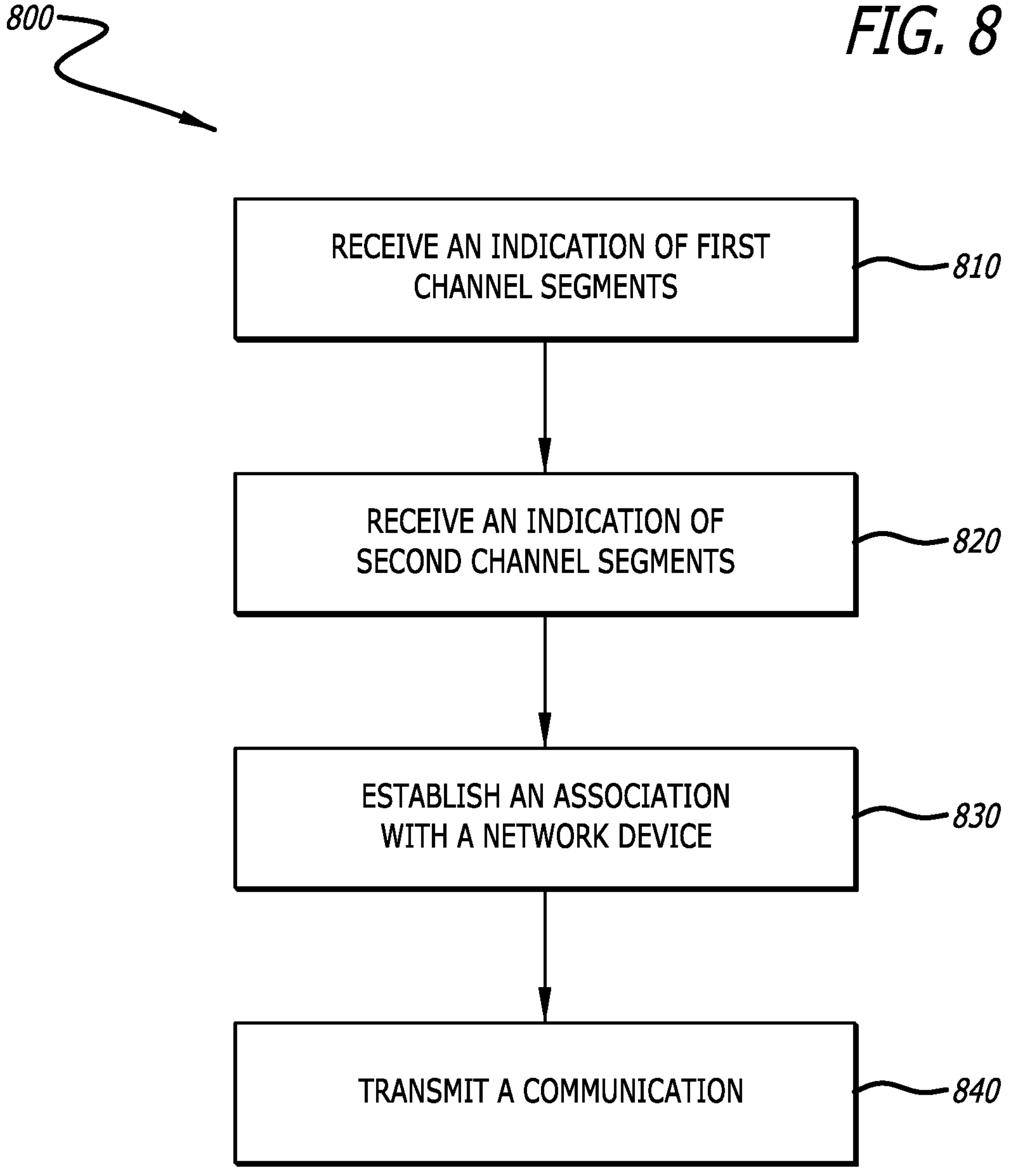
FIG. 8 is a flowchart showing a process for establishing communication with a network device in accordance with various embodiments of the disclosure.

Referring to FIG. 8, a flowchart showing a process 800 for establishing communication with a network device in accordance with various embodiments of the disclosure is shown. In many embodiments, the process 800 may receive an indication of one or more first channel segments (block 810). This can involve the client device receiving a signal from a network device that identifies the first channel segments. The first channel segments can be part of a channel that has a specific channel width. In a number of embodiments, the first channel segments may be usable with the SP transmit power mode and the LPi transmit power mode.

In a variety of embodiments, the process 800 may receive an indication of one or more second channel segments (block 820). This can involve the client device receiving a signal from the network device that identifies the second channel segments. The second channel segments can be part of the channel. In some embodiments, the second channel segments may be usable with just the LPi transmit power mode.

In more embodiments, the process 800 can establish an association with a network device (block 830). This can involve the client device sending an association request to the network device and receiving an association response. In additional embodiments, the association may be established based on an announced BSSID associated with the first channel segments and/or the second channel segments. In further embodiments, the association can be established based on a BSSID associated with the SP transmit power mode (i.e., an SP BSSID). In still more embodiments, the association may be established based on a BSSID associated with the LPi transmit power mode (i.e., an LPi BSSID).

In still further embodiments, the process 800 can transmit a communication (block 840). This can involve the client device sending data packets, acknowledgment frames, or other types of frames to the network device. In still additional embodiments, the communication may be transmitted 1) over just the first channel segments in the SP mode, 2) over the entire channel in the LPi mode, or 3) over the first channel segments in the SP mode and over the second channel segments in the LPi mode. In some more embodiments, the actual transmit power scheme utilized for the transmission can be based on an indication from the network device and/or a choice made by the client device. In certain embodiments, the communication may include a first signal transmitted in the SP mode via a first link associated with an MLO and a second signal transmitted in the LPi mode via a second link associated with the MLO.

Although a specific embodiment for establishing communication with a network device suitable for carrying out the various steps, processes, methods, and operations described herein is discussed with respect to FIG. 8, any of a variety of systems and/or processes may be utilized in accordance with embodiments of the disclosure. For example, the process may include additional operations such as, but not limited to, adjusting the transmit power mode based on the received indications of the first and second channel segments. The elements depicted in FIG. 8 may also be interchangeable with other elements of FIGS. 1-7, 9, and 10 as required to realize a particularly desired embodiment.

Figure 9:
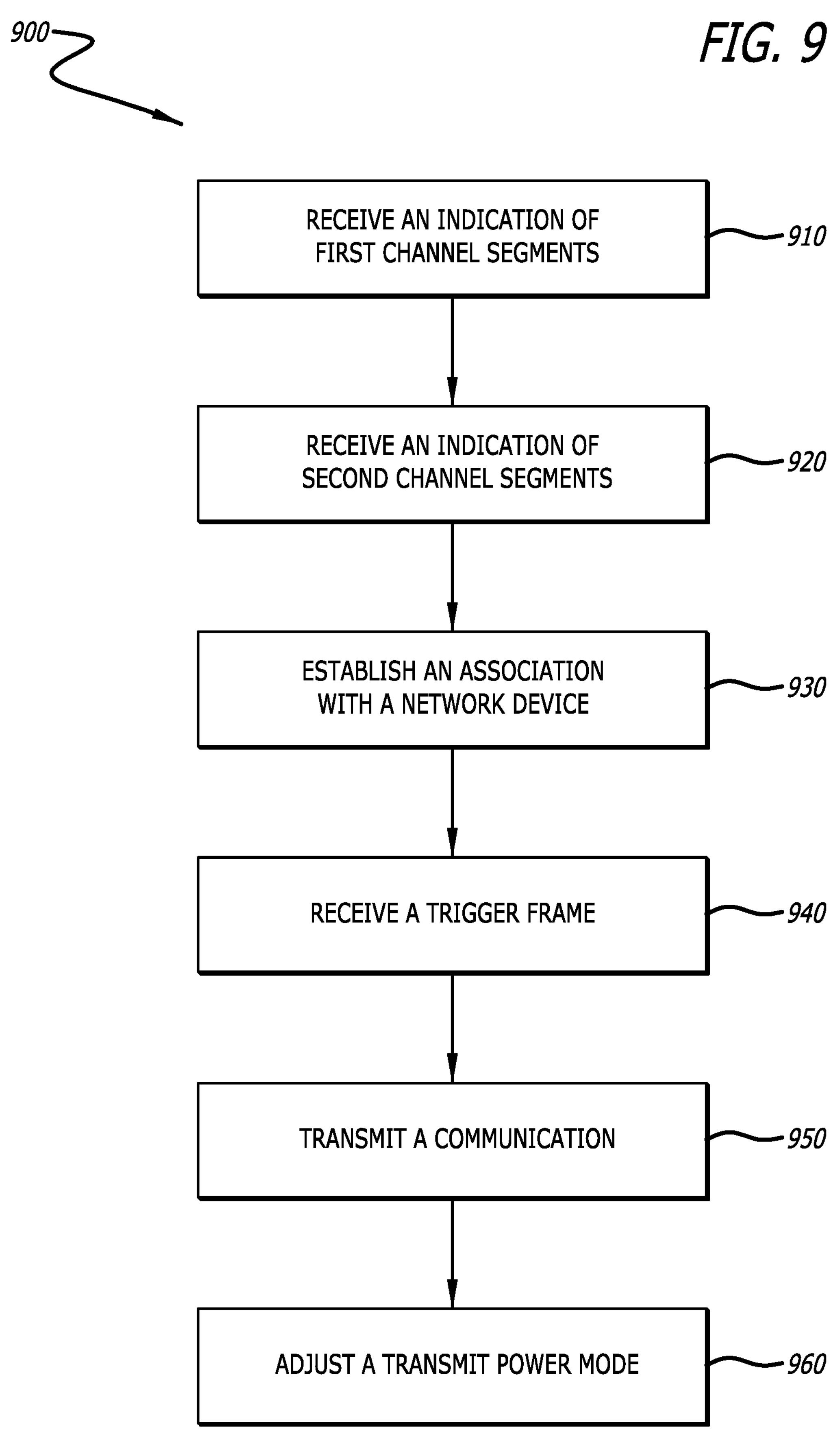
FIG. 9 is a flowchart showing a process for participating in a multi-user communication session in accordance with various embodiments of the disclosure.

Referring to FIG. 9, a flowchart showing a process 900 for participating in a multi-user communication session in accordance with various embodiments of the disclosure is shown. In many embodiments, the process 900 may receive an indication of one or more first channel segments (block 910). This can involve the client device receiving a signal from a network device that identifies the first channel segments. The first channel segments can be part of a channel that has a specific channel width. In a number of embodiments, the first channel segments may be usable with the SP transmit power mode and the LPi transmit power mode.

In a variety of embodiments, the process 900 may receive an indication of one or more second channel segments (block 920). This can involve the client device receiving a signal from the network device that identifies the second channel segments. The second channel segments can be part of the channel. In some embodiments, the second channel segments may be usable with just the LPi transmit power mode.

In more embodiments, the process 900 can establish an association with a network device (block 930). This can involve the client device sending an association request to the network device and receiving an association response. In additional embodiments, the association may be established based on an announced BSSID associated with the first channel segments and/or the second channel segments. In further embodiments, the association can be established based on a BSSID associated with the SP transmit power mode (i.e., an SP BSSID). In still more embodiments, the association may be established based on a BSSID associated with the LPi transmit power mode (i.e., an LPi BSSID).

In still further embodiments, the process 900 can receive a trigger frame (block 940). In still additional embodiments, the trigger frame may initiate a multi-user communication session, where multiple client devices can transmit in response to the trigger frame. The trigger frame can include scheduling data for the client devices. In some more embodiments, the trigger frame can include an indication of the transmit power mode (e.g., the SP mode or the LPi mode) for an RU allocated to the client device. In certain embodiments, the indication of the transmit power mode may be based on whether the RU is included in the first channel segments or the second channel segments. In yet more embodiments, the RU can be allocated to the client device based on a capability of the client device. For example, if the client device is an SP client device, an RU located in the first channel segments may be allocated to the client device; on the other hand, if the client device is an LPi client device, an RU located in the second channel segments can be allocated to the client device.

In still yet more embodiments, the process 900 can transmit a communication (block 950). This can involve the client device sending data packets, acknowledgment frames, or other types of frames to the network device. In many further embodiments, the communication may be transmitted 1) over just the first channel segments in the SP mode, 2) over the entire channel in the LPi mode, or 3) over the first channel segments in the SP mode and over the second channel segments in the LPi mode. In many additional embodiments, the actual transmit power scheme utilized for the transmission can be based on an indication from the network device and/or a choice made by the client device. In still yet further embodiments, the communication may include a first signal transmitted in the SP mode via a first link associated with an MLO and a second signal transmitted in the LPi mode via a second link associated with the MLO.

In still yet additional embodiments, the communication can be transmitted based on scheduling data included in the trigger frame.

In several embodiments, the process 900 can adjust a transmit power mode (block 960). In several more embodiments, the client device may switch from the LPi mode to the SP mode based on an indication from the network device. The network device may transmit such an indication in response to detecting that the client device is nearing an LPi cell edge. In numerous embodiments, the indication can include an unsolicited probe response frame to advertise the presence of an SP BSSID. In numerous additional embodiments, the indication may include a BTM request to recommend that the client device roam to the SP BSSID. In further additional embodiments, the client device can switch from the SP mode to the LPi mode in response to an indication from the network device. The network device may transmit such an indication in response to detecting that the client device is close to the network device (e.g., the distance between the client device and the network device may be less than a threshold). In some embodiments, in addition to causing the client device (and/or itself) to switch to the LPi mode, the network device can also increase the channel width to include both the first channel segments and the second channel segments in response to detecting that the client device is close the network device.

Although a specific embodiment for participating in a multi-user communication session suitable for carrying out the various steps, processes, methods, and operations described herein is discussed with respect to FIG. 9, any of a variety of systems and/or processes may be utilized in accordance with embodiments of the disclosure. For example, the process may include additional operations such as, but not limited to, receiving an allocation of an RU from the network device, which can guide the client device in adjusting its transmit power mode and scheduling its transmissions. The elements depicted in FIG. 9 may also be interchangeable with other elements of FIGS. 1-8 and 10 as required to realize a particularly desired embodiment.

Figure 10:
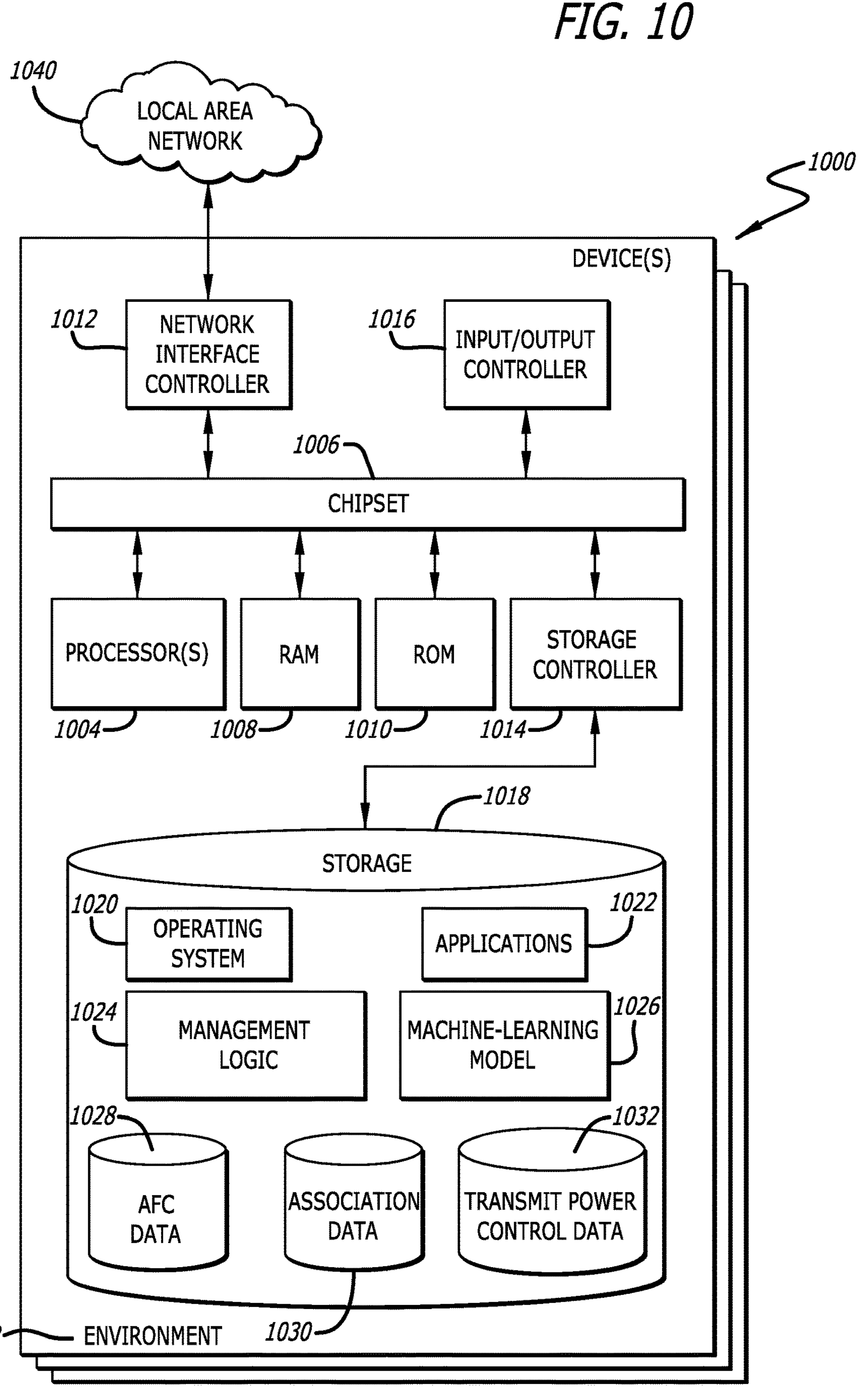
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface card ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, AFC data 1028, association data 1030, and transmit power control data 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10, and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a management logic 1024. The management logic 1024 can be a component of a network device or a client device that manages various aspects of the operations of the device. This may include tasks such as, but not limited to, selecting a channel, identifying channel segments, adjusting transmit power modes, and/or coordinating communications with other devices.

In a number of embodiments, the storage 1018 can include AFC data 1028. The AFC data 1028 may be received from an AFC system. The AFC data 1028 can provide guidance on available frequencies, power restrictions, and/or other regulatory requirements, which can be utilized to optimize network performance and minimize interference.

In various embodiments, the storage 1018 can include association data 1030. The association data 1030 may relate to the establishment of a connection between a network device and a client device, which can also be linked to the transmit power mode and the identified first and second channel segments. The association data 1030 can include elements such as, but not limited to, the BSSIDs, the transmit power modes, and/or the channel segments to be used for communication.

In still more embodiments, the storage 1018 can include transmit power control data 1032. The transmit power control data 1032 may be utilized to guide the adjustment of the transmit power mode in a network device or a client device. The transmit power control data 1032 can be influenced by various factors such as, but not limited to, the identified first and second channel segments, network conditions, and/or the capabilities of the devices involved in the communication.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to analyze historical network data, predict optimal transmit power modes, and/or identify suitable first and second channel segments for communication.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network device, comprising:

a processor;

at least one network interface controller configured to provide access to a network; and a memory communicatively coupled to the processor, wherein the memory comprises a management logic that is configured to:

select a channel;

identify one or more first channel segments of the channel, the one or more first channel segments being usable with a first transmit power mode and a second transmit power mode;

identify one or more second channel segments of the channel, the one or more second channel segments being usable with the second transmit power mode;

announce the identified one or more first channel segments or the identified one or more second channel segments; and transmit an indication of an allocation of a resource unit (RU) to a client device, wherein the indication of the allocation of the RU comprises an indication of the first transmit power mode or the second transmit power mode based on whether the RU is located in the identified one or more first channel segments or the identified one or more second channel segments;

wherein the indication of the first transmit power mode or the second transmit power mode is based further on a capability of the client device.

2. The network device of claim 1, wherein the one or more first channel segments or the one or more second channel segments are identified based on an automated frequency coordination (AFC) response.

3. The network device of claim 1, wherein the channel is selected based on an automated frequency coordination (AFC) response.

4. The network device of claim 1, wherein the channel comprises a plurality of sub-channels.

5. The network device of claim 4, wherein at least one channel segment of the identified one or more first channel segments or the identified one or more second channel segments corresponds to one of the plurality of sub-channels.

6. The network device of claim 1, wherein the selected channel spans a boundary between a first unlicensed national information infrastructure (U-NII) band a second U-NII band, the identified one or more first channel segments are included in the first U-NII band, and the identified one or more second channel segments are included in the second U-NII band.

7. The network device of claim 1, wherein to announce the identified one or more first channel segments and the identified one or more second channel segments, the management logic is further configured to:

announce a first indication associated with the first transmit power mode; and announce a second indication associated with the second transmit power mode.

8. The network device of claim 7, wherein the first indication is associated with the identified one or more first channel segments and the identified one or more second channel segments, and the second indication is associated with the identified one or more second channel segments.

9. The network device of claim 7, wherein the first indication or the second indication is associated with a beacon or a probe response.

10. The network device of claim 7, wherein the first indication is associated with a first basic service set identifier (BSSID), and the second indication is associated with a second BSSID.

11. The network device of claim 10, wherein the management logic is further configured to establish an association with a client device based on the first BSSID or the second BSSID.

12. The network device of claim 10, wherein the management logic is further configured to:

detect that a client device in association with the second BSSID is nearing an edge of a cell associated with the second BSSID; and transmit an indication of the first BSSID to the client device in response to the detecting that the client device is nearing the edge of the cell.

13. The network device of claim 12, wherein the indication of the first BSSID is transmitted via an unsolicited probe response or a basic service set (BSS) transition management (BTM) request.

14. The network device of claim 1, wherein the management logic is further configured to transmit a communication to a client device based on at least one of the identified one or more second channel segments and the second transmit power mode in response to detecting that a distance between the client device and the network device is less than a threshold.

15. The network device of claim 1, wherein the first transmit power mode corresponds to a standard power mode, and the second transmit power mode corresponds to a low-power indoor mode.

16. A client device, comprising:

a processor;

at least one network interface controller configured to provide access to a network; and a memory communicatively coupled to the processor, wherein the memory comprises a management logic that is configured to:

receive an indication of one or more first channel segments of a channel or one or more second channel segments of the channel, the one or more first channel segments being usable with a first transmit power mode and a second transmit power mode, the one or more second channel segments being usable with the second transmit power mode;

transmit a communication based on the indication; and transmit the indication of an allocation of a resource unit (RU) to a client device, wherein the indication of the allocation of the RU comprises an indication of the first transmit power mode or the second transmit power mode based on whether the RU is located in an identified one or more first channel segments or the identified one or more second channel segments;

wherein the indication of the first transmit power mode or the second transmit power mode is based further on a capability of the client device.

17. The client device of claim 16, wherein to transmit the communication, the management logic is further configured to simultaneously transmit, via a first link, a first communication based on at least one of the one or more first channel segments and the first transmit power mode and, via a second link, a second communication based on at least one of the one or more second channel segments and the second transmit power mode, and the first link and the second link are associated with a multi-link operation.

18. A method for wireless communication, comprising:

selecting a channel;

identifying one or more first channel segments of the channel, the one or more first channel segments being usable with a first transmit power mode and a second transmit power mode;

identifying one or more second channel segments of the channel, the one or more second channel segments being usable with the second transmit power mode;

announcing an indication of the identified one or more first channel segments or the identified one or more second channel segments; and transmitting an indication of an allocation of a resource unit (RU) to a client device, wherein the indication of the allocation of the RU comprises an indication of the first transmit power mode or the second transmit power mode based on whether the RU is located in the identified one or more first channel segments or the identified one or more second channel segments;

wherein the indication of the first transmit power mode or the second transmit power mode is based further on a capability of the client device.

* * * * *